Sept. 13, 1966

A. LÉCHOT 3,272,040

ARRANGEMENT FOR FEEDING AN AUTOMATIC LATHE
WITH BARS TO BE MACHINED

Filed Feb. 10, 1964

4 Sheets-Sheet 1

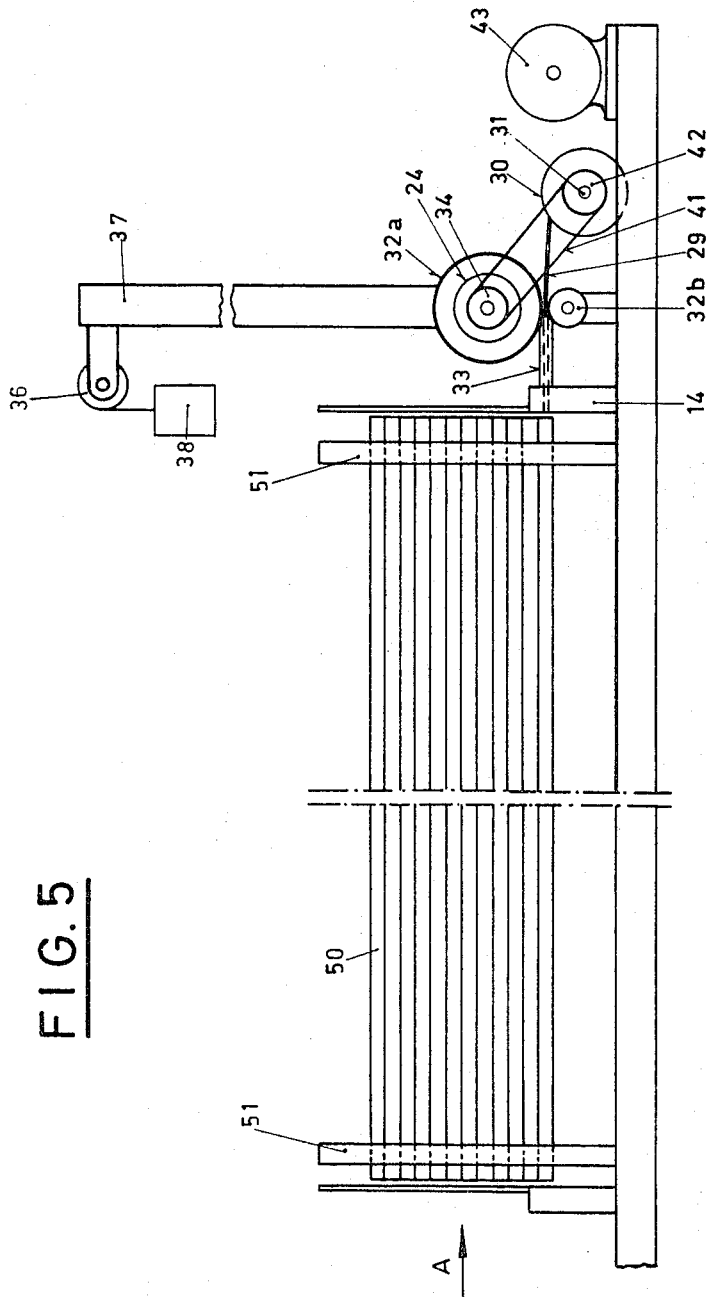

United States Patent Office 3,272,040
Patented Sept. 13, 1966

3,272,040
ARRANGEMENT FOR FEEDING AN AUTOMATIC
LATHE WITH BARS TO BE MACHINED
André Léchot, Ateliers de Mecanique, Orvin,
Bern, Switzerland
Filed Feb. 10, 1964, Ser. No. 343,557
Claims priority, application Switzerland, Feb. 8, 1963,
1,579/63
13 Claims. (Cl. 82—2.7)

My invention has for its object an arrangement for feeding an automatic lathe with bars to be machined, said arrangement being chiefly applicable to the case of a lathe including a headstock for the rotary and rectilinear drive of each successive bar to be machined by the cutting tools of the lathe, which tools are located ahead of the headstock while said bars are carried in the housings provided in a loading magazine positioned to the rear of the headstock. In such lathes, a pusher-member slides reciprocatingly inside the successive housings as required by the machining of the bar carried by each housing by said tools so as to act on the rear end of the bar during the machining stage with a view to preventing any receding of the bar when the headstock which has ended its stroke towards said tools releases the bar and recedes towards the loading magazine so as to engage again said bar and to make it progress by a further step while means are provided for removing said pusher member out of the loading magazine when it has reached its foremost position therein.

My improved arrangement provides a pusher member constituted by the front end of a yielding cable of which the opposite end is secured to a pulley round which the cable is wound, while means are provided for the transient connection between the cable and the bar to be machined, further means are provided for the reciprocating drive of the cable in opposite directions and still further means are provided for guiding the cable between said driving means and the input end of the housing in the loading magazine which carries the bar to be machined so as to prevent any folding of the cable during operation.

According to a preferred embodiment of my invention, wherein the guiding means for the cable inserted between the loading magazine and the headstock, are designed so as to take hold of the end of the bar remaining inside the headstock at least at the moment at which the pusher member recedes under the action of the cable-driving means.

Figure 1:
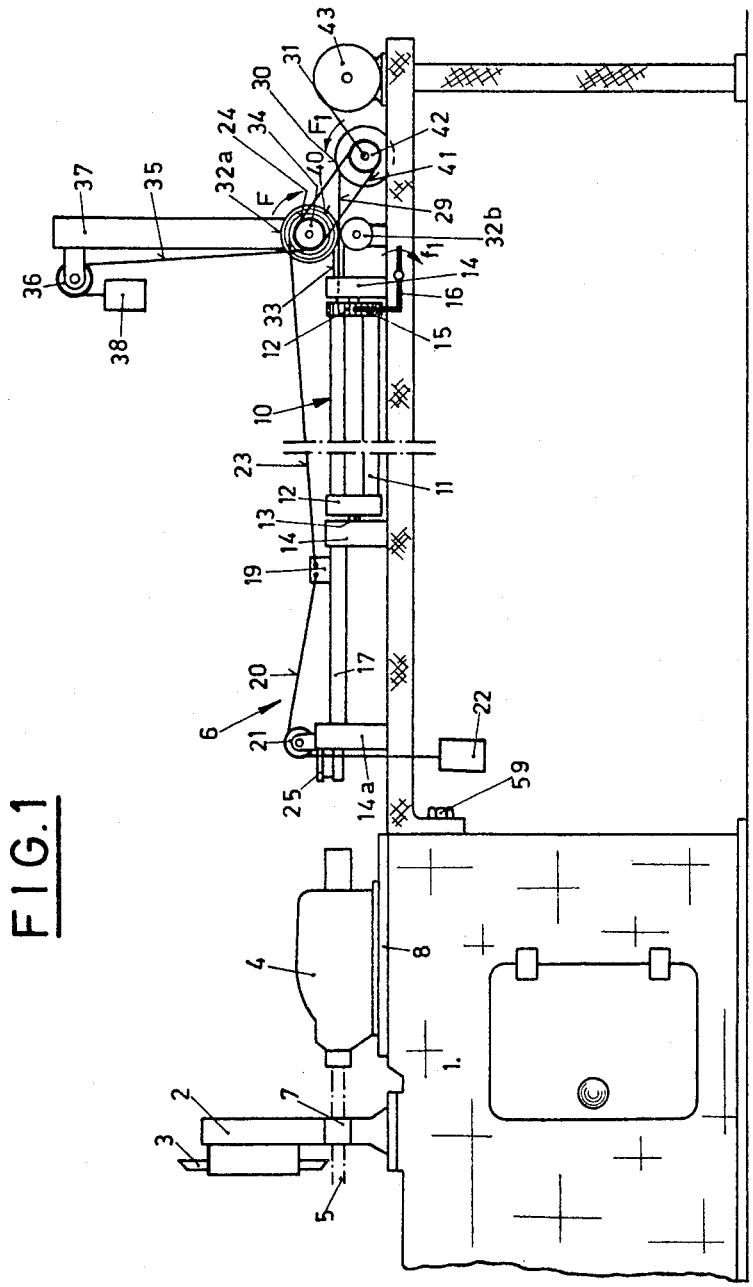
Figure 2:
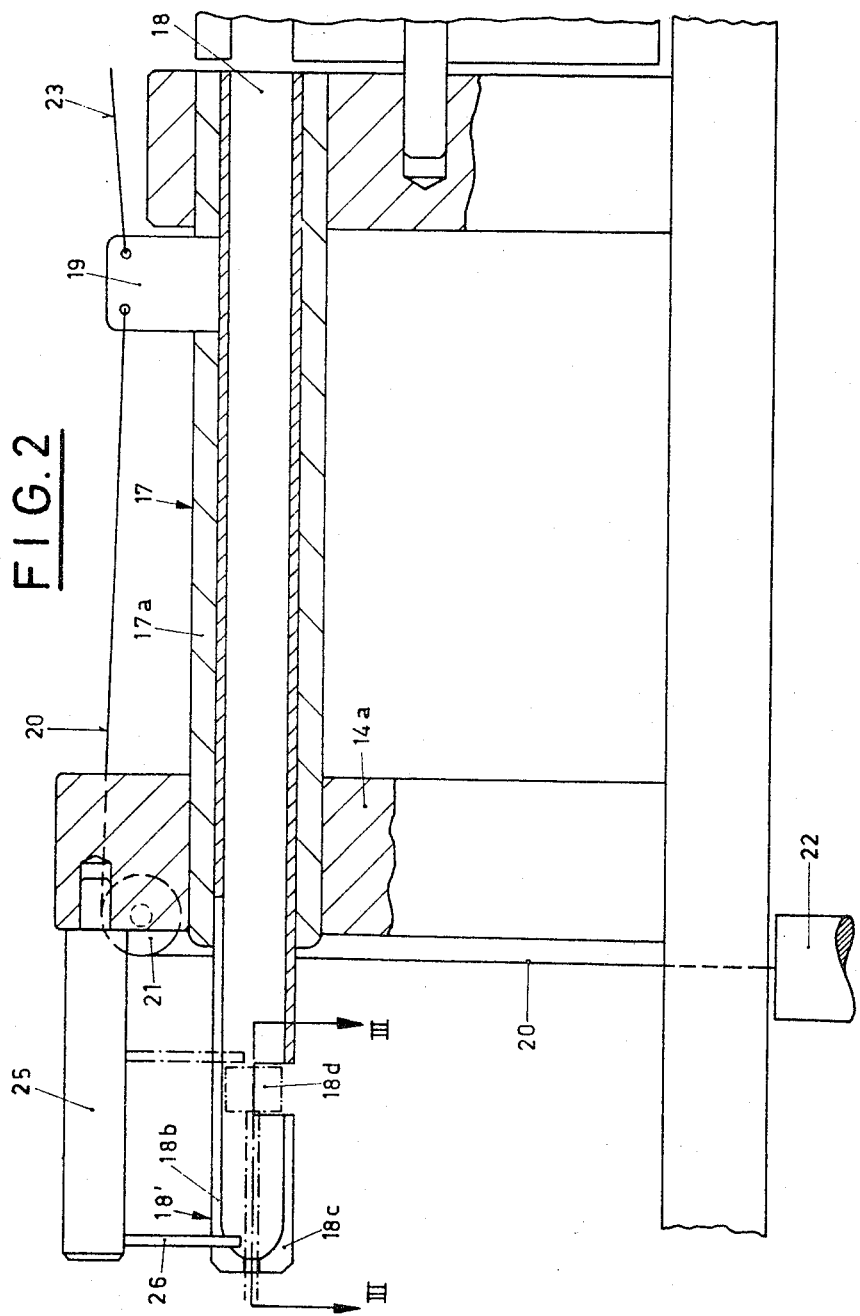
Figure 3:
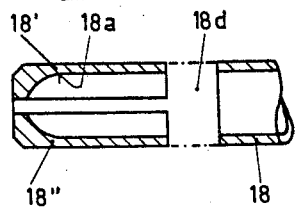
Figure 4:
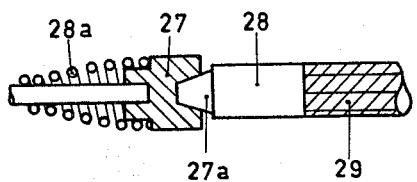
Figure 6:
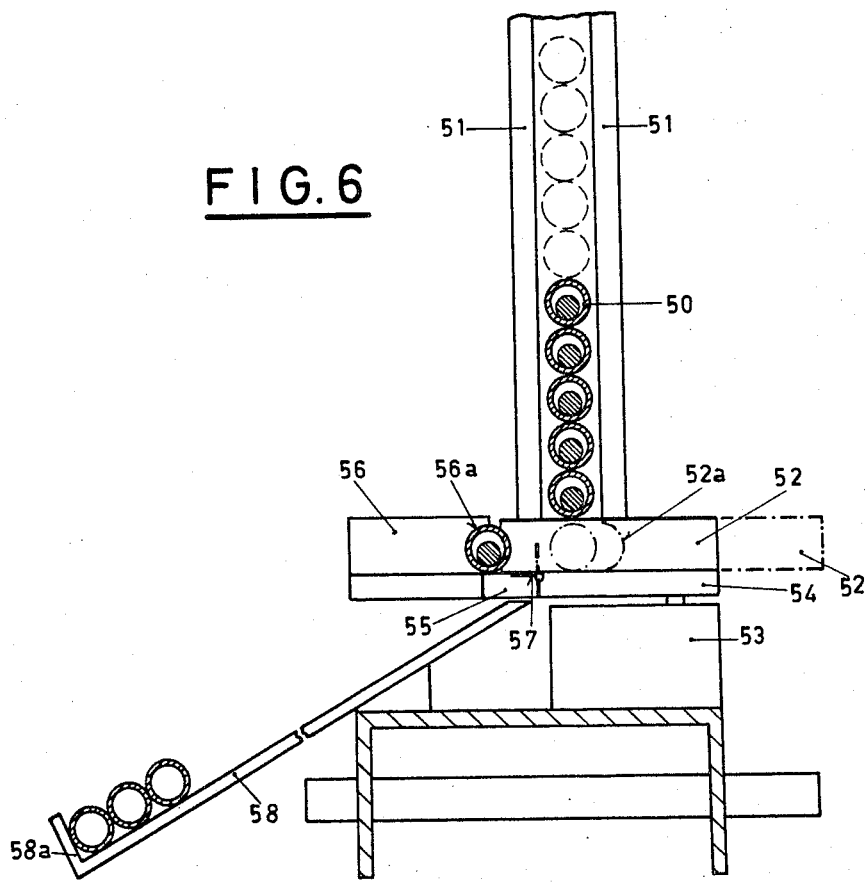

I will now describe my invention with further detail, reference being made to the accompanying drawings illustrating by way of example and in a non-limiting sense, a preferred embodiment of my invention together with a modification thereof. In said drawings:

FIG. 1 is an elevational side view of the lathe incorporating my improved arrangement, FIG. 2 is a view of a detail of the bar-feeding means on a larger scale, FIG. 3 is a cross-section through line III—III of FIG. 2, FIG. 4 is an elevational view on a larger scale of the bar-controlling pusher member, FIG. 5 is a view of a modification of the loading magazine and associated means also in side elevational view, FIG. 6 is an end view of said modification as seen in the direction of the arrow A.

FIG. 1 illustrates in a highly diagrammatic manner, a slicing or screw-cutting lathe, said lathe including a frame 1 on which is fitted a carrier 2 for cutting tools such as 3, a headstock 4 carried to the rear of said carrier and adapted to make a bar to be machined such as 5 revolve and move stepwise towards the carrier 2, the lathe including furthermore a system 6 for automatically feeding the lathe with bars to be machined.

The tool carrier 2 is provided with a sleeve 7 for the centering of the end of the bar 3, said sleeve 7 being revolvably carried in said carrier so as to follow the rotation of the bar.

The headstock 4 is provided inwardly with pincers wihch are not illustrated and which clamp the bar during its progression towards the tool-holder 2 and also while it is being driven into rotation. Said pincers release automatically the bar when the headstock is about to return rearwardly before making the bar progress by a further step.

The headstock 4 illustrated is of a conventional structure and need not be described with any further detail. It is sufficient to mention that it is carried on slideways 8 provided on the frame and over which it is adapted to slide in both directions under the action of driving means which are not illustrated.

The bar-feeding system 6 includes a loading magazine of the barrel type 10, which barrel is provided with eight longitudinal housings constituted by as many tubes 11 which are interconnected at both ends by perforated plates 12, said plates 12 being carried each by a spindle 13 whereby the barrel is allowed to rock with reference to the lugs 14 projecting above the frame 1 outside each end of said barrel. The tubes 11 may be of a length ranging between about 2.5 and 4 meters. The periphery of the right-hand plate 12 is provided with eight teeth adapted to engage in succession a projection 15 in antagonism with returning means which are not illustrated, as provided by a lever 16 adapted to pivot in the direction of the arrow f1. It is thus possible for each movement of the lever 16 to make the barrel 10 progress by one eighth of a revolution, chiefly with a view to replacing one of the housings of the barrel by the next housing, as described hereinafter.

Said barrel is laid on the frame 1 in a manner such that the uppermost tube forming it extends coaxially with the headstock 4. Between the barrel and the headstock, there is also provided a sleeve 17 coaxial with the headstock 4 and carried by the lug 14 shown on the left-hand side of the barrel and by a further lug 14a spaced with reference to the headstock 4 in its rearmost position by a length which is slightly larger than the longest fraction of the bar which cannot be subjected to machining; said spacing depends obviously on the distance separating the pincers provided on the headstock from the tool-holder 2 and the waste length of the bar may reach, according to the cases, a length of 15 cm. for instance.

The sleeve 17 is slotted throughout its length as shown at 17a (FIG. 2) and carries an inner sleeve 18 to which is secured an upstanding lug 19 which serves alternatingly for the drive of the sleeve 18 towards the headstock and towards the barrel as described hereinafter. Said lug 19 is secured to a cable section 20 engaging a transmission pulley 21 revolvably carried by the lug 14a, the free end of said cable section carrying a weight 22 adapted to urge the sleeve 18 towards the left-hand side of the drawing. To said lug 19 is secured a further cable section 23 the other end of which is wound over a pulley 24 to be described hereinafter.

The inner surface of the inner sleeve 18 is cylindrical except at its left-hand end 18a (FIG. 3) at which its diameter is restricted as shown by the inner inwardly incurved outline of the sleeve 18. Said end is furthermore provided with longitudinal slots 18b and 18c which form two parallel projections 18' and 18", the slot 18b being longer than the slot 18c. Furthermore, each projection 18', 18" is cut transversely in its lower section 18d.

Above the left-hand end of the sleeve 18 a support 25 secured to the lug 14a carries a yielding projection 26 the lower end of which engages the slot 18b. Each of the bars carried in the barrel is provided at its rear end with a cylindrical head 27 and is connected therewith by a spring 28a (FIG. 4) the diameter of which is slightly less than that of the bores of the tubes forming the housings in the barrel and than the bore of the inner sleeve 18. The length of said head 27 is smaller than the breadth of each cut 18d and its rear surface is provided with a frustoconical recess 27a adapted to be engaged by a pusher member 28 provided at the end of a cable 29; said head 27 can engage in succession each housing in the barrel so as to urge forwardly the bar contained in said housing towards the left hand side of the drawing, until the barrel has been completely emptied of its bars. The pusher member 28 is welded to the cable 29 so as to be rigidly secured thereto.

The cable 29 is wound at its end opposed to the barrel round a drum 30 fitted loosely over a spindle 31 and it is urged towards the barrel under the action of two rollers 32a and 32b the former of which is a driving roller while the latter acts in the same direction as said former roller and engages same with a sufficient pressure for the friction produced to make the roller 32a drive the cable whenever it rotates. Between the rollers 32a–32b and the nearest lug 14, the cable passes through a short sleeve 33 projecting with reference to said lug and preventing the cable from moving out of its path as it progresses in either direction. Said cable guiding sleeve 33 opens into a port, not illustrated, which is formed in said lug 14 and opens in its turn into the uppermost housing of the barrel coaxially with said housing.

The roller 32a is rigid with a drum 34 round which a cable 35 is wound, which cable extends vertically so as to engage a transmission pulley 36 revolvably carried by an upright 37, carrying also at its lower end the spindles for said rollers 32a and 32b.

At its free end, the cable 35 carries a weight 38 which urges it into a movement unwinding it off the drum or pulley 34 so as to make said drum rotate in the direction of the arrow F (FIG. 1). The spindle rigid with roller 32a also carries the above-mentioned pulley or drum 24 round which said cable 23 is wound and which can be operatively connected with the spindle through a clutch which is not illustrated and which operates automatically. To the spindle rigidly carrying the roller 32a is also keyed a pulley 40 whereas the spindle 31 carrying the drum 30 carrying the driving cable 29 is rigid with a pulley 42 connected with the pulley 40 through a belt 41. 43 designates a motor driving the drum 30 and the pulley 42 associated therewith in the direction of the arrow F1. A clutch which is not illustrated allows coupling and uncoupling the motor.

The operation of the lathe and of the bar-feeding system illustrated is as follows: at the beginning of its operation, a barrel filled with bars is positioned on the lathe, each bar being provided at its rear end with a head such as 27 while the cable 29 is in its rearmost wound in position and the end of the associated pusher member 28 is located in registry with the right-hand openings of the barrel housings. The weights 22 and 38 are then in their uppermost positions and the cables 23 and 35 through which they are connected with the corresponding coaxial drums, respectively 24 and 34, are wound in to a maximum extent over said drums. This being done, the drum 24 is released with reference to its carrier spindle and the weight 22 is allowed to sink so that the sleeve 18 is allowed to slide towards the left-hand side under the action of said weight and to enter the bore in the headstock. The weight 38 is then released so that it drops and urges the cable 29 towards the headstock whereby the bar is pushed also thereby towards the headstock and moves first inside the sleeve 18 and then inside the bore in the headstock. While the bar is being machined by the tools 3 of the lathe, it progresses towards said tools under the action of the thrust produced by the weight 38 and which is transmitted by the cable 29 to the pincers carried by the headstock.

When the head 27 carried by the bar which is being machined engages the left-hand end of the sleeve 18, that is when the remaining length of bar is not sufficient for it to be machined in the lathe, this bar waste is removed under automatic control means operated from the inside of the headstock. This automatic control means couples the motor 43 with the spindle 31 of the drum 30 so that the latter urges the cable 29 outwardly of the sleeve 18 first and then outwardly of the barrel. This produces simultaneously the rising of the weight 38 towards the pulley 36 under the action of the cable 35 carrying it and which is wound round its drum 34 rigid with the pulley 40.

As soon as the cable 29 has passed out of the sleeve 18, which moment is ascertained by the operator by means of a reference mark carried by said cable and appearing for instance at a suitable moment between the rollers 32a and 32b, the operator couples the drum 24 carrying the cable 23 with the spindle carrying the roller 32a and consequently said cable is drawn towards the right-hand side and shifts the inner sleeve 18 in the same direction so as to collapse said sleeve 18 inside the outer sleeve 17 as illustrated in the drawing.

As it moves towards the right-hand side of FIGS. 1 and 2, the sleeve 18 carries of course with it the waste section of the bar still engaging the bore of the headstock 4 and which is held fast inside said sleeve by its head 27. Said waste section enters then a position such that its head 27 lies in the section of the sleeve 18 lying to the left-hand side of the cut 18d, which latter section is also provided with the slot 18b.

During the first fraction of the receding movement of the sleeve 18, the yielding projection 26 engages frictionally through its lower bent end, the outer surface of said sleeve 18. Said projection engages at a predetermined moment the slot 18b of the sleeve by a length sufficient for it to hold fast the head 27 on the bar waste when said bar waste registers with said projection. The bar waste remains consequently fast in position during the remainder of the rearward movement of the sleeve 18 and drops onto the frame 1 on which it may be recovered as soon as the cut 18d actually registers with the head 27, through which cut the head is caused to drop.

The sleeve 18 continues its progression towards the right-hand side of the drawing and it returns finally into the position illustrated in FIG. 2. From this moment onwards, the drum 24 controlling the cable 23 is disengaged with reference to the spindle of the roller 32a. When the cable 29 has completely released the barrel 10, the operator acts in the direction of the arrow f1 on the lever 16 so as to make the barrel revolve by one eighth of revolution and to make it enter a position for which the axis of the cable registers with a further bar-filled housing.

For the feeding of the barrel, it is necessary to make its support pivot horizontally for instance after unscrewing the nut 59 (FIG. 1).

In a modification, the loading by means of a barrel may be replaced by a vertical loading system such as that illustrated in FIGS. 5 and 6. In said modification, the bars to be machined are housed inside the tubes 50 stacked in superposition between parallel guiding uprights 51 and forming the actual loading magazine. The latter extends above a distributor or slider 52 adapted to move horizontally under the action of a control member 53 between the position illustrated in solid lines in FIG. 6 and a second position drawn in dot and dash lines. The slider 52 moves over a carrier plate 54 provided with an output opening 55 the size of which corresponds with that of the tubes 50 in the loading magazines; said plate carries also a stop 56 extending in the path of the slider 52.

The slider 52 and the stop 56 are of equal heights and their common height is equal to the diameter of the tubes 50. Furthermore, the sides of said parts 52 and 56 facing each other are provided with a semi-circular groove respectively at 52a and 56a, said grooves forming together a cylindrical housing as soon as the slider 52 impinges against the stop 56. The arrangement is such that the axis of the housing extends coaxially with the axis of the guiding tube 33 and of the sleeve 18 of the first embodiment.

The opening 55 may be partly covered by a flap 57 pivotally secured to the right-hand side edge of said opening and occupying normally an opening-releasing vertical position as illustrated. Said flap is provided with returning means which are not illustrated so as to be urged back into said vertical position for instance each time it has been rocked into a horizontal opening-covering position as illustrated in dot-and-dash lines. Furthermore, the breadth of the flap is such that when a tube engages the stop 56, it may rise into its vertical position without impinging against said tube.

Underneath the opening 55, the arrangement is provided with downwardly sloping rails 58 the outer ends of which are bent upwardly at 58a, said rails being adapted to carry away the empty tubes 50 as will be now described.

For the operation of said embodiment illustrated in FIGS. 5 and 6, there is first introduced between the guiding uprights 51, a predetermined number of tubes 50 filled each with a bar to be machined, while the slider 52 is in its extreme right-hand position, as illustrated in dot-and-dash lines. The lowermost tube 50 drops then onto the plate 54 and is prevented from moving towards the opening 55 by the flap 57.

The control member 53 is then operated so as to feed the slider 52 towards the abutment 56, while it urges along with the slider the tube 50 resting on the plate 54. The flap 57 rocks under the action of the thrust exerted by said tube and enters its horizontal position so as to prevent the tube from dropping through the opening 55 onto the guiding rails 58. The flap is held in said position by the slider 52 which at the end of its stroke, is positioned as illustrated in solid lines in its extreme left-hand position in contact with the abutment 56. The tube 56 is then coaxial with the driving cable 29.

The bar carried in the tube 50 is caused to move and the bar waste is removed out of the headstock, in the same manner as that described precedingly.

When the cable has been returned into its rearmost position, the slider 52 is returned automatically towards the right hand side so that the flap 57 may return into its normal vertical position, the breadth of said flap being such that it does not impinge against the empty tube 50 during its rising movement. The tube 50 lying on the plate 54 is no longer held by the flap and drops through the opening 55 onto the guiding rails 58 over which it runs into engagement with the upwardly bent terminal section 58a in the case of the tube which has been dropped first or with the precedingly dropped tube for the following tubes.

What I claim is:

1. In combination with a lathe including a slidable headstock provided with a bore and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable, means detachably connecting one end of said cable with the bar carried inside the operative tube aligned with the headstock bore through the end of said bar facing away from said headstock bore, two rollers between which the cable is frictionally held, a weight, an auxiliary cable to which said weight is suspended and adapted to drive the roller in a predetermined direction into rotation upon release of the weight to thereby move the main cable and bar forwardly through last-mentioned tube to ensure machining the bar in the lathe, means guiding the main cable along a rectilinear path between the rollers and said last-mentioned tube and further driving means adapted to be operatively connected with last-mentioned roller to drive same in the direction opposed to said predetermined direction to draw the main cable outwardly away from said last-mentioned tube.

2. In combination with a lathe including a slidable headstock provided with a bore, and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable, means detachably connecting one end of said cable with the bar carried inside the operative tube aligned with the headstock bore through the end of said bar facing away from said headstock bore, two rollers between which the cable is frictionally held, a weight, an auxiliary cable to which said weight is suspended and adapted to drive the roller in a predetermined direction into rotation upon release of the weight to thereby move the main cable and bar forwardly through last-mentioned tube to ensure machining of the bar in the lathe, means guiding the main cable along a rectilinear path between the rollers and said last-mentioned tube and further driving means adapted to be operatively connected with last-mentioned roller to drive same in the direction opposed to said predetermined direction to draw the main cable outwardly away from said last-mentioned tube and means releasing said further means at least when the free end of the main cable has cleared the last-mentioned tube.

3. In combination with a lathe including a slidable headstock provided with a bore, and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable, means detachably connecting one end of said cable with the bar carried inside the operative tube aligned with the headstock bore through the end of said bar facing away from said headstock bore, two rollers between which the cable is frictionally held, a weight, an auxiliary cable to which said weight is suspended and adapted to drive the roller in a predetermined direction into rotation upon release of the weight to thereby move the main cable and bar forwardly through last-mentioned tube to ensure machining of the bar in the lathe, means guiding the main cable along a rectilinear path between the rollers and said last-mentioned tube further driving means adapted to be operatively connected with last-mentioned roller to drive same in the direction opposed to said predetermined direction to draw the main cable outwardly away from said last-mentioned tube and to raise the weight to a maximum during said outward movement of the main cable.

4. In combination with a lathe including a slidable headstock provided with a bore and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable, means detachably connecting one end of said cable with the bar carried inside the operative tube aligned with the headstock bore through the end of said bar facing away from said headstock bore, two rollers between which the cable is frictionally held, a weight, an auxiliary cable to which said weight is suspended and adapted to drive the roller in a predetermined direction into rotation upon release of the weight to thereby move the main cable and bar forwardly through last-mentioned tube to ensure machining of the bar in the lathe, a tubular member enclosing and guiding the main cable along a rectilinear path between the rollers and said last-mentioned tube and further driving means adapted to be operatively connected with last-mentioned roller to drive same in the direction opposed to said predetermined direction to draw the main cable outwardly away from said last-mentioned tube.

5. In combination with a lathe including a sliding headstock provided with a bore, and at least one cutting tool, an arrangement for feeding bars to be machined into the headstock bore, comprising a magazine including a plurality of similar horizontal superposed tubes parallel with the axis of the headstock bore and adapted to carry each a bar to be machined, vertical parallel walls guiding the tubes, a distributor adapted to ensure the dropping of the tube which is lowermost at each operation into alignment with the headstock bore, a main cable, means detachably connecting one end of said cable with the bar carried inside the operative tube aligned with the headstock bore through the end of said bar facing away from said headstock bore, means adapted to drive stepwise said cable and bar forwardly through the tube and headstock bore to make said bar engage the cutting tool, and means guiding said cable entering the operative tube along a rectilinear path.

6. In combination with a lathe including a sliding headstock provided with a bore, and at least one cutting tool, an arrangement for feeding bars to be machined into the headstock bore, comprising a magazine including a plurality of similar horizontal superposed tubes parallel with the axis of the headstock bore and adapted to carry each a bar to be machined, vertical parallel walls guiding the tubes, a plate the thickness of which is substantially equal to the outer diameter of a tube and provided with a transverse edge adapted to match the lateral semi-cylindrical surface of a tube and lying underneath the level of the lowermost tube and in registry with the headstock bore level, a horizontal surface over which said plate is adapted to slide between a position holding the lowermost tube in position and a position releasing same onto said horizontal surface, a stop cooperating with said plate in last-mentioned position to hold the lowermost tube on said horizontal surface in alignment with the headstock bore, a main cable, means detachably connecting one end of said cable with the bar carried inside the operative tube aligned with the headstock bore through the end of said bar facing away from said headstock bore, means adapted to drive stepwise said cable and bar forwardly through the tube and headstock bore to make said bar engage the cutting tool, and means guiding the cable along a rectilinear path at its entrance into the cooperating tube.

7. In combination with a lathe including a sliding headstock provided with a bore, and at least one cutting tool, an arrangement for feeding bars to be machined into the headstock bore, comprising a magazine including a plurality of similar horizontal superposed tubes parallel with the axis of the headstock bore and adapted to carry each a bar to be machined, vertical parallel walls guiding the tubes, a plate the thickness of which is substantially equal to the outer diameter of a tube and provided with a transverse edge adapted to match the lateral semi-cylindrical surface of the tube and lying underneath the level of the lowermost tube, a horizontal surface over which said plate is adapted to slide between a position holding the lowermost tube in position and a position releasing same onto said horizontal surface, said horizontal surface being provided with an opening through which the tube drops upon receding movement of the plate into its first-mentioned position, a stop cooperating with said plate in last-mentioned position to hold the lowermost tube on said horizontal surface in alignment with the headstock bore, a main cable, means detachably connecting one end of said cable with the bar carried inside the operative tube aligned with the headstock bore through the end of said bar facing away from said headstock bore, means adapted to drive stepwise said cable and bar forwardly through the tube and headstock bore to make said bar engage the cutting tool and means releasing the cable and returning the plate and the cable back into their starting positions at the end of the operation on the bar carried by the operative tube.

8. In combination with a lathe including a sliding headstock provided with a bore, and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable the diameter of which is almost equal to that of the magazine tubes, means detachably connecting one end of said cable with the bar carried inside the operative tube aligned with the headstock bore through the end of said bar facing away from said headstock bore, means adapted to drive stepwise said cable and bar forwardly through the tube and headstock bore to make said bar engage the cutting tool, a stationary sleeve provided with a longitudinal slot and extending coaxially between last-mentioned operative magazine tube and the headstock bore, an inner guiding sleeve co-axially sliding in said stationary sleeve, including a lug extending through the slot in the latter and through which the bar and main cable are guided during their forward movement and the non-machined waste end of the bar carried by the inner sleeve is removed upon rearward movement of the cable, and means controlling the rearward movement of the cable and of the inner sleeve.

9. In combination with a lathe including a sliding headstock provided with a bore, and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable the diameter of which is almost equal to that of the magazine tubes, means detachably connecting one end of said cable with the bar carried inside the operative tube aligned with the headstock bore through the end of said bar facing away from said headstock bore, means adapted to drive stepwise said cable and bar forwardly through the tube and headstock bore to make said bar engage the cutting tool, a stationary sleeve provided with a longitudinal slot and extending coaxially between last-mentioned operative magazine tube and the headstock bore, an inner guiding sleeve coaxially sliding in said stationary sleeve, including a lug extending through the slot in the latter and through which the bar and main cable are guided during their forward movement and the non machined waste end of the bar carried by said tube is removed upon rearward movement of the cable, a further cable secured to said lug, a transmission pulley carried by the stationary sleeve, and engaged by said further cable, and a weight suspended to said further cable and adapted to urge the inner sleeve forwardly towards the headstock, and means adapted to return the main cable and inner sleeve rearwardly.

10. In combination with a lathe including a sliding headstock provided with a bore, and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable the diameter of which is almost equal to that of the magazine tubes, means detachably connecting one end of said cable with the bar carried inside the operative tube aligned with the headstock bore through the end of said bar facing away from said headstock bore, means adapted to drive stepwise said cable and bar forwardly through the tube and headstock bore to make said bar engage the cutting tool, a stationary sleeve provided with a longitudinal slot and extending coaxially between last-mentioned operative magazine tube and the headstock bore, an inner guiding sleeve coaxially sliding in said stationary sleeve, including a lug extending through the slot in the latter and through which the bar and main cable are guided during their forward movement and the non machined waste end of the bar carried by said tube is removed upon rearward movement of the cable, means controlling the rearward movement of the inner sleeve with said waste end, within the stationary sleeve, and means for the ejection of said waste end out of the inner sleeve.

11. In combination with a lathe including a slidable headstock provided with a bore, and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable, means detachably connecting one end of said cable with the bar carried inside the operative tube aligned with the headstock bore through the end of said bar facing away from said headstock bore, two rollers between which the cable is frictionally held, a weight, an auxiliary cable to which said weight is suspended and adapted to drive the roller in a predetermined direction into rotation upon release of the weight to thereby move the main cable and bar forwardly through last-mentioned tube to ensure machining of the bar in the lathe and means guiding the main cable along a rectilinear path between the rollers and said last-mentioned tube, further driving means adapted to be operatively connected with last-mentioned roller to drive same in the direction opposed to said predetermined direction to draw the main cable outwardly away from said last-mentioned tube, a stationary sleeve provided with a longitudinal slot and extending coaxially between last-mentioned operative magazine tube and the headstock bore, an inner guiding sleeve coaxially sliding in said stationary sleeve, including a lug extending through the slot in the latter and through which the bar and main cable are guided during their forward movement and the non machined waste end of the bar carried by said tube is removed upon rearward movement of the cable, a still further cable one end of which is secured to said lug, a pulley on which the other end of the cable is wound, means adapted to couple said pulley with said last-mentioned roller to ensure the control by the further driving means both of the rearward movement of the inner sleeve and of the main cable.

12. In combination with a lathe including a sliding headstock provided with a bore and at least one cutting tool, an arrangement for feeding bars to be machined into the headstock bore, comprising a magazine including a plurality of similar horizontal tubes parallel with the axis of the headstock bore and adapted to carry each a bar to be machined and to be set in succession in alignment with the headstock bore, a main cable the diameter of which is almost equal to that of the magazine tubes, means detachably connecting one end of said cable with the bar carried inside the operative tube aligned with the headstock bore through the end of said bar facing away from said headstock bore, means adapted to drive stepwise said cable and bar forwardly through the tube and headstock bore to make said bar engage the cutting tool, a stationary sleeve provided with a longitudinal slot and extending coaxially between last-mentioned operative magazine tube and the headstock bore, an inner guiding sleeve coaxially sliding in said stationary sleeve, including a lug extending through the slot in the latter and through which the bar and main cable are guided during their forward movement, said inner sleeve being provided with an upper and a lower longitudinal slot at its end facing the headstock and with a cut across its lower section to either side of said lower slot, a stationary depending projection engaging the upper slot of the inner sleeve and adapted to shift forwardly when the inner sleeve recedes the waste non-machined end of the bar carried by the inner sleeve to make said waste end drop off the inner sleeve, and means controlling the rearward movement of the cable and of the inner sleeve.

13. In combination with a lathe having a sliding headstock provided with a bore and at least one cutting tool, an arrangement for feeding bars to be machined into the headstock bore, which comprises a magazine having a plurality of similar horizontal tubes parallel with the axis of the headstock bore and adapted to each carry a bar to be machined and to be set in succession in alignment with the headstock bore, a yielding element, means detachably connecting one end of said element with the bar carried inside the operative tube aligned with the headstock bore through the end of said bar facing away from said headstock bore, means adapted to drive stepwise said element and bar forwardly through said tube and headstock bore to make said bar engage said cutting tool, a stationary sleeve provided with a longitudinal slot and extending coaxially between said operative magazine tube and said headstock bore, an inner guiding sleeve coaxially sliding in said stationary sleeve having a lug extending through the slot in said stationary sleeve and guiding said bar and said yielding element during their forward movement; the non-machined waste end of the bar carried by said tube being removed from said inner sleeve upon rearward movement of said yielding element.

References Cited by the Examiner

UNITED STATES PATENTS

| 2,746,128 | 5/1956 | Barron et al. | 12—2.7 X |
| 3,027,018 | 3/1962 | Hemingway | 214—1.5 |
| 3,041,904 | 7/1962 | Konrad | 82—2.7 |

FOREIGN PATENTS

| 571,614 | 3/1933 | Germany. |

WILLIAM W. DYER, JR., *Primary Examiner.*

LEONIDAS VLACHOS, *Examiner.*